United States Patent
Amsden et al.

(10) Patent No.: US 7,861,214 B2
(45) Date of Patent: Dec. 28, 2010

(54) COMPUTER METHOD AND APPARATUS FOR COLLAPSING PROGRAMMING METAMODELS

(75) Inventors: James Raymond Amsden, Cary, NC (US); Kenneth Earle Hussey, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 762 days.

(21) Appl. No.: 10/983,418

(22) Filed: Nov. 8, 2004

(65) Prior Publication Data

US 2006/0101388 A1    May 11, 2006

(51) Int. Cl.
*G06F 9/44* (2006.01)
(52) U.S. Cl. .................. 717/104; 717/106
(58) Field of Classification Search .......... 717/101–123
See application file for complete search history.

(56) References Cited

U.S. PATENT DOCUMENTS

| | | | |
|---|---|---|---|
| 5,987,247 A | 11/1999 | Lau | |
| 6,337,696 B1 | 1/2002 | Lindhorst et al. | |
| 6,356,955 B1 * | 3/2002 | Hollberg et al. | 719/315 |
| 6,611,955 B1 | 8/2003 | Logean et al. | |
| 7,039,908 B2 | 5/2006 | Steensgaard | |
| 7,069,537 B2 | 6/2006 | Lazarov | |
| 7,219,328 B2 | 5/2007 | Schloegel et al. | |
| 7,293,254 B2 | 11/2007 | Bloesch et al. | |
| 7,404,176 B2 | 7/2008 | Reeder et al. | |
| 2002/0104068 A1 | 8/2002 | Barrett et al. | |
| 2002/0133812 A1 | 9/2002 | Little et al. | |
| 2002/0147763 A1 | 10/2002 | Lee et al. | |
| 2004/0015843 A1 | 1/2004 | Quan, Jr. | |
| 2004/0139095 A1 | 7/2004 | Trastour et al. | |
| 2005/0071805 A1 | 3/2005 | Lauterbach et al. | |
| 2005/0076328 A1 | 4/2005 | Berenbach et al. | |
| 2005/0160401 A1 | 7/2005 | Russo et al. | |
| 2005/0188353 A1 | 8/2005 | Hasson et al. | |
| 2005/0261923 A1 | 11/2005 | Brown et al. | |
| 2005/0268281 A1 | 12/2005 | Letkeman et al. | |
| 2006/0064667 A1 | 3/2006 | de Freitas | |
| 2006/0101376 A1 | 5/2006 | Gutz et al. | |

FOREIGN PATENT DOCUMENTS

JP    2001075817    3/2001

OTHER PUBLICATIONS

OMG Document, "UML 2.0 Infrastructure Specification", Sep. 2003, Object Management Group, Inc., pp. i-vi, 1-187.*

OMG Document, "Unified Modeling Language: Superstructure", Aug. 2003, Object Management Group, Inc., Version 2.0, pp. 1-609.*

(Continued)

*Primary Examiner*—Ted T Vo
(74) *Attorney, Agent, or Firm*—Hamilton, Brook, Smith & Reynolds, P.C.

(57) ABSTRACT

Computer method and apparatus collapse program metamodels to provide a collapsed, in syntax view of the subject metamodel. The invention method and apparatus obtain multiple programming model packages. Each said package is formed of a respective plurality of model elements from the subject metamodel. Next the invention combines (e.g., collapses) the multiple programming model packages together to form a resultant collapsed package. The resultant collapsed package enables generation of an implementation of a desired software program and avoids the need for package links (representing package merge relationships between packages).

18 Claims, 5 Drawing Sheets

OTHER PUBLICATIONS

Budinsky, F. et al., "Dynamic EMF," *Eclipse Modeling Framework—A Developer's Guide*, Addison-Wesley (2004), table of contents.

Robak, S. et al., "Extending the UML for Modelling Variability for System Families," *Int. J. Appl. Math. Comput. Sci.*, 12(2): 285-298 (2002).

Szostak, S. et al., "UML Extensions for Modeling Real-Time and Embedded Systems," *The International Workshop on Discrete-Event System Design*, DESDes '01, Przytok, Poland, pp. 1-6 (Jun. 27-29, 2001).

D'Souza, D. et al., "First Class Extensibility for UML—Packaging of Profiles, Stereotypes, Patterns," In *UML '99—The Unified Modeling Language—Beyond the Standard*, Second International Conference, Fort Collins, Colorado, pp. 265-277 (Oct. 28-30, 1999).

Perez-Martinez, J.E., "Heavyweight extensions to the UML metamodel to describe the C3 architectural style," ACM SIGSOFT Software Engineering Notes, 28(3): 1-6, ACM Press (May 2003).

Selonen, P. and Xu, J., "Validating UML Models Against Architectural Profiles," *Proceedings of 9th European Software Engineering Conference/11th ACM SIGSOFT International Symposium on Foundations of Software Engineering '03*, Helsinki (ACM SIGSOFT Software Engineering Notes) 28(5): 58-67 (Sep. 1-5, 2003).

de Miguel, M. et al., "UML Extensions for the Specification and Evaluation of Latency Constraints in Architectural Models," *Proceedings of the Second International Workshop on Software and Performance* (ACM Press), Ottawa, Ontario, Canada, pp. 83-88 (2000).

Cortellessa, V. and Pompei, A., "Towards a UML profile for QoS: a contribution in the reliability domain," *Proceedings of the Fourth International Workshop on Software and Performance*, Redwood Shores, California (ACM SIGSOFT Software Engineering Notes) 29(1): 197-206 (Jan. 14-16, 2004).

Merks, E., "The Eclipse Modeling Framework: Introducing Modeling to the Java™ Technology Mainstream," *JavaOne Sun's 2004 Worldwide Java Developer Conference*, slides 1-37 (2004).

OMG Document, "UML 2.0 Infrastructure Specification," Sep. 2003, Object Management Group, Inc., pp. 1-187.

"Unified Modeling Language: Superstructure," Version 2.0, Final Adopted Specification, pp. 569-584 (2003).

Alhir, Sinan Si, "Extending the Unified Modeling Language (UML)," retrieved from: http://citeseer.ist.psu.edu/alhir99extending.html (Jan. 3, 1999).

Gogolla, Martin, et al., "Analysis of UML Stereotypes within the UML Metamodel," *UML 2002, LNCS 2460*, pp. 84-99 (2002).

Budinsky, et al., "Eclipse Modeling Framework: A Developer's Guide," sections 5.7, 13.6; *Addison Wesley Professional* (Aug. 11, 2003).

Büttner, F. and Gogolla, M., "On Generalization and Overriding in UML 2.0," *OCL and Model Driven Engineering, UML 2004 Conference Workshop*, pp. 1-15 (2004).

Akehurst, et al., "Implementing Associations: UML 2.0 to Java 5," *Software and Systems Modeling*, 6(1):3-35 (2007).

Budinsky, et al., "Eclipse Modeling Framework: A Developer's Guide," sections 5.5, 8.2: *Addison Wesley Professional* (Aug. 11, 2003).

Unified Modeling Language: Infrastructure Version 2.0, 3rd revised submission to OMG RFP ad/00-09-01, Jan. 6, 2003, Version 2.0, pp. 1-173.

Budinsky, F., et al., "Dynamic EMF," *Eclipse Modeling Framework—A Developer's Guide*, Addison-Welscy (2004), 34-35.

* cited by examiner

COMPUTER METHOD AND APPARATUS FOR COLLAPSING PROGRAMMING METAMODELS

BACKGROUND OF THE INVENTION

With the proliferation of software products and services, attempts have been made to codify and/or standardize the designing of software and software architecture. Examples include:

The Booch Method and Modeling Language (see "Object Oriented Analysis and Design" by Grady Booch);

James Rumbaugh and Associates' Object Modeling Technique (OMT);

the Object Oriented Software Engineering (OOSE) method by Ivar Jacobson; and the Unified Modeling Language (UML) which combines the foregoing and industry best practices.

The UML is a visual modeling language (with formal syntax and semantics) for communicating a model or conceptionalization. Thus the modeling language specification specifies modeling elements, notation and usage guidelines and not order of activities, specification of artifacts, repository interface, storage, run-time behavior and so forth. In general, at the modeling level a "problem" is posed in terms of a customer's needs and requirements and may be referred to as the business problem system. The software designer develops a "solution" software product and or service that addresses the problem. The UML syntax enables software designers to express (specify and document) the subject problems and solutions in a standardized manner, while the UML semantics enable knowledge about the subject system to be captured and leveraged during the problem solving phase. See "UML in a Nutshell" by Simon Si Alhir, published by O'Reilly & Associates, September 1998. As such, the UML enables the sharing of information (including prior solution portions) and extension (without reimplementation) of core object oriented concepts (analysis and design) during the iterative problem-solving process for designing software products.

The adopted UML 2.0 specification uses a so called "package merge" to define a number of different modeling languages and compliance levels. A "package" is a grouping of semantically related model elements and serves as a container for model elements that may be instantiated. A "relationship" is a connection between model elements that adds semantics to models. A "package merge" is a relationship between two packages where the contents of the target (merged) package are merged with the contents of the source (merging) package through specialization and redefinition. It is semantically equivalent to defining a subclass in the source package of every class in the target package. A package merge is indicated by a visibility relationship with a <<merge>> stereotype between two packages in a model.

The Rose model for UML 2.0 Superstructure contains many package merge relationships. In a lot of cases, the specialization relationships have been explicitly included. In some cases, the corresponding redefinitions have also been explicitly defined. In most instances, however, this is not the case. Most redefinitions are implicitly defined through matching names as specified by the package merge semantics. Package merge does not introduce any new semantics into UML 2.0; it is only a convenience for specifying a set of generalizations and redefinitions. These generalizations and redefinitions can just as well be specified explicitly. In fact, UML 2.0 Infrastructure does not use package merge, but instead does the merge "by hand" and explicitly specifies all the generalizations and redefinitions.

The Eclipse Modeling Framework (EMF) can be used to generate Java code from a Rose model, but encounters a number of issues when dealing with redefinitions. Even if the Rose model and/or the EMF code generator were modified to resolve these issues, the resulting implementation would still be unusable. The source of this problem is the way redefinition was used throughout the specification as a means of partitioning the model into levels of compliance. This may make sense at a conceptual level, but it complicates the target Application Program Interface (API) to a great extent.

Although not introduced by package merge, these problems are exacerbated significantly by the shear number of package merges specified in the UML 2.0 Superstructure. Some of the issues, most resulting from redefinitions, are:

Results in a huge class hierarchy with multiple packages having classes with the same name.

Creates a very large number of uninteresting redefinitions (property redefinitions that do not change anything but the type, which cannot be handled by Java anyway).

Creates a lot of instances of multiple inheritance of properties having the same name.

A "downcast" model-to-model mapping from more general instances to more specific instances is required in order to use the existing general model instances in an extended API.

A more specific class does not contain some of its redefined constraints because the property has to be implemented in its superclass.

Client applications have to do a lot of downcasting because Java cannot implement UML 2.0 redefinition semantics; after the many levels of merges in UML 2.0, client developers will likely find it difficult to remember what has to be cast to what and when, leading to unexpected results.

Merged constraints are lost for matching properties because, due to Java limitations, the superclass property is chosen when eliminating the property redefinitions.

Using any of the inherited superclasses requires the client application to use a fully qualified class name.

SUMMARY OF THE INVENTION

This invention provides a solution to the problems above.

In a preferred embodiment, computer method and apparatus collapse program metamodels to provide a collapsed, in syntax view of the subject metamodels. The invention method and apparatus obtain multiple programming model packages. Each said package is formed of a respective plurality of model elements from the subject metamodel. Next the invention collapses the multiple programming model packages together to form a resultant collapsed package. The resultant collapsed package enables generation of an implementation of a desired software program and avoids the need for package links (representing package merge relationships between packages) of the prior art.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
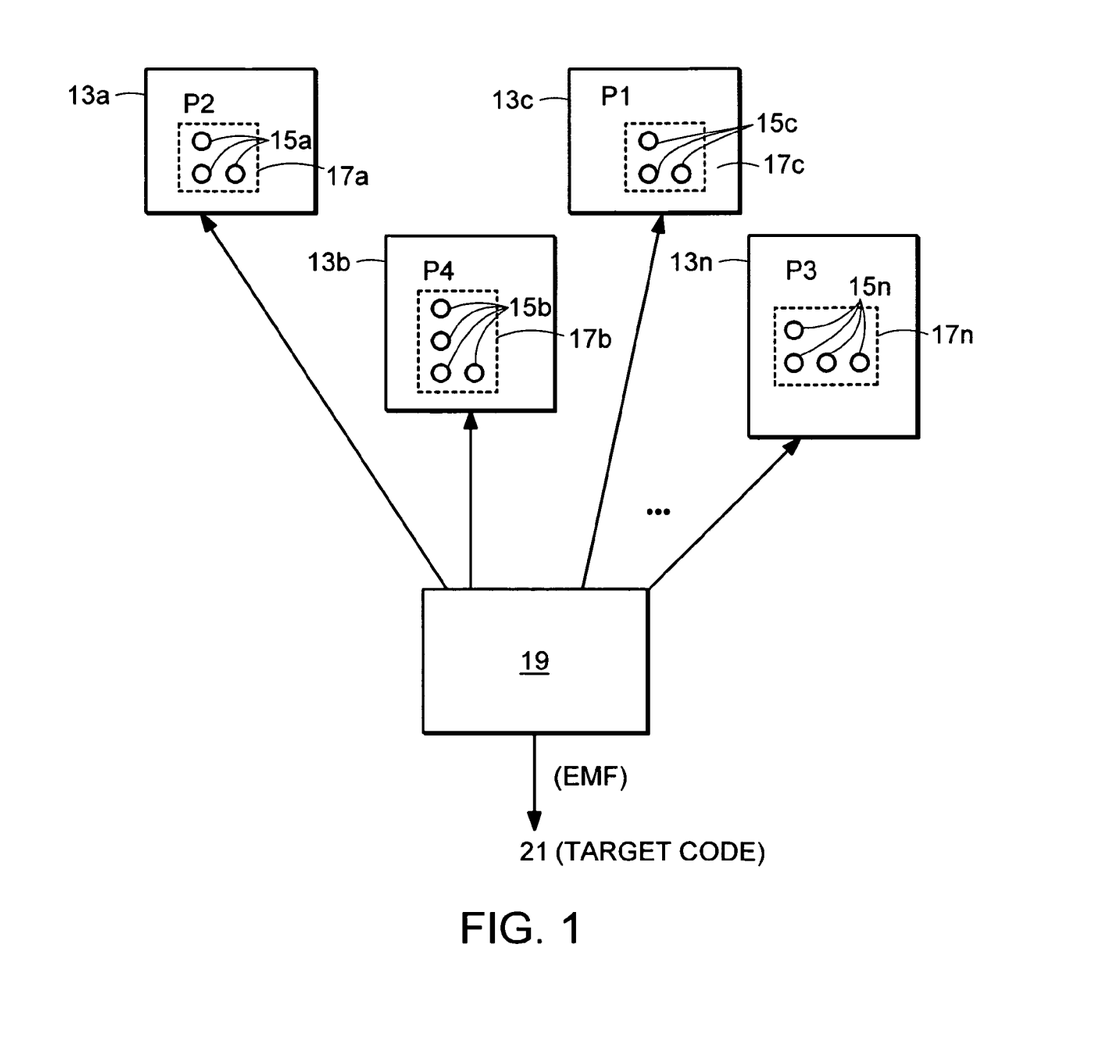
FIG. 1 is a schematic view of one embodiment of the present invention.

By way of overview, the present invention defines a new package relationship that transforms the majority of the redefinitions in the UML 2.0 metamodel. This new relationship, <<collapse>>, results in a flattened API with one namespace in which there exists only one type with a given name. After having eliminated the majority of the redefinitions, the remaining ones may be dealt with in an appropriate way, given the limitations of the Java language. FIG. 1 is illustrative.

As shown in FIG. 1, given are a plurality of packages (P1, P2, P3, P4) 13a, b . . . n, each formed of a respective set of model elements 15 and package dependencies 17 (shown in dotted lines).

In the UML 2.0 specification, UML is a root package. Package levels are:

"kernel"—the core package level where concepts are introduced;

"statemachines"—the level that specifies concepts related to states (such as "class");

"profiles"—the level where extensions of the modeling language are specified or profiled;

"actions"—the level where atomic activities are defined; and

"activities"—formed of plural actions, with subcategories of this level being basic, intermediate and completed.

In other views of software modeling, the kernel package level may provide a definition, meaning and organization of a "class" concept, an "operation" concept and other concepts, while the statemachine level definition of "class" is more elaborated toward states. Thus there may be multiple different concepts of "class" (for example) depending on the package and package level.

Referring to FIG. 1, for each of the various model elements 15, there is a concept of "class". Class may be defined one way for one package 13 (at for example a kernel or core package level) and a different way for another package 13 (at a same or different package level such as state machine states or activities/basic).

The present invention collapses all of the packages 13 in UML 2.0 and produces a destination package 19 that effectively blends or otherwise combines all of the classes in the specification, using the most general types and the most general multiplicities. That is, destination package 19 is effectively the collapsed result of P1 through P4 (subject packages 13a, . . . 13n) and their respective package dependencies. In a preferred embodiment, destination package 19 is named 'UML2' and has the familiar structure and syntax of UML 2.0 so as to be sharable (usable) among all users. To that end, the present invention provides a transformation from packages 13 of various (ambiguous) namespace to a collapsed, in syntax view of subject metamodel.

An implementation 21 is able to be generated from the resulting code generation model at 19 using, for example, EMF or the like. A complete XML schema can also be generated, which defines one namespace for all of the model elements it specifies. Although this schema deviates from that proposed by OMG in the adopted UML 2.0 specification, Applicants believe it is more useful because it ensures that all tools are using the same schema and that no data is lost during interchange, regardless of which subset of the types in UML 2.0 a given tool is using.

In a preferred embodiment, the collapse transformation is defined by creating a new package 19 and adding visibility relationships with a stereotype of <<collapse>> between this new collapsing/merged result package 19 and all packages 13 which are to be collapsed. When the transformation is processed, all contents from the collapsed packages 13 and all of their subpackages are collapsed, recursively, into the collapsing package 19 based on the following rules. This avoids the need for the sets of links (for package merge relationships between packages) required in the prior art.

Package Rules

Packages match by name.

Subpackages of the collapsed package 13 are recursively collapsed into the collapsing package 19.

For non-matching sub-packages, the collapsing sub-package is the collapsing package in the collapsing package 19; for matching sub-packages, the collapsing sub-package is the matching sub-package.

Classifiers in the collapsed package 13 are collapsed into the collapsing package 19 according to classifier collapse rules.

All other non-generalizable elements of the collapsed package 13 are copied into the collapsing package 19 with all references transformed to corresponding collapsed elements in the collapsing package 19.

If any contained collapse fails, the package collapse is not well-formed.

Classifier (Class, Data Type, and Enumeration) Rules

Classifiers match by name.

For non-matching classifiers, the collapsing classifier is a newly created classifier in the collapsing package 19; for matching classifiers, the collapsing classifier is the matching classifier.

Nested classifiers of the collapsed classifier are recursively collapsed into the collapsing classifier (but the UML 2.0 specification does not have nested classes).

All features from the collapsed classifier are collapsed into the collapsing class according to their rules.

If any contained feature collapse fails, the package collapse is not well-formed.

Enumeration Rules

Enumeration literals match by name.

Matching enumeration literals are not changed; non-matching enumeration literals from the collapsed enumeration are added to the collapsing enumeration (by the non-generalizable element rule).

If matching enumeration literals are not in the same sequence, the package collapse is not well-formed.

Property Rules

Properties match by name.

For non-matching properties, the collapsing property is a newly created property in the collapsing classifier; for matching properties, the collapsing property is the matching property.

A collapse of a matching property has the most general conforming type of the collapsed and collapsing properties; the property type is converted to the corresponding matching type in the collapsing package 19, if any.

A collapse of a matching property has the most general multiplicity of the collapsed and collapsing properties; a collapsing multiplicity has the least lower bound and greatest upper bound of all collapsed multiplicities.

Association Rules

Associations are binary.

Associations match by name (including if they have no name) and their end association ends match by name.

A collapse of a matching association is accomplished by collapsing the association classifier and its ownedEnd properties.

If any matching ends cannot be collapsed, the package collapse is not well-formed.

Operation Rules

Operations match by name and parameter types, not including any return type.

For non-matching operations the collapsing operation is a newly created operation with the same signature in the collapsing classifier; the collapsed operations are copied into the collapsing classifier.

If an operation matches in all but the return type, the package collapse is not well-formed.

Constraint Rules

The constraints of the collapsed model elements 15 are added to the constraints of the collapsing model elements forming destination package 19 (by the non-generalizable element rule).

Figure 2:
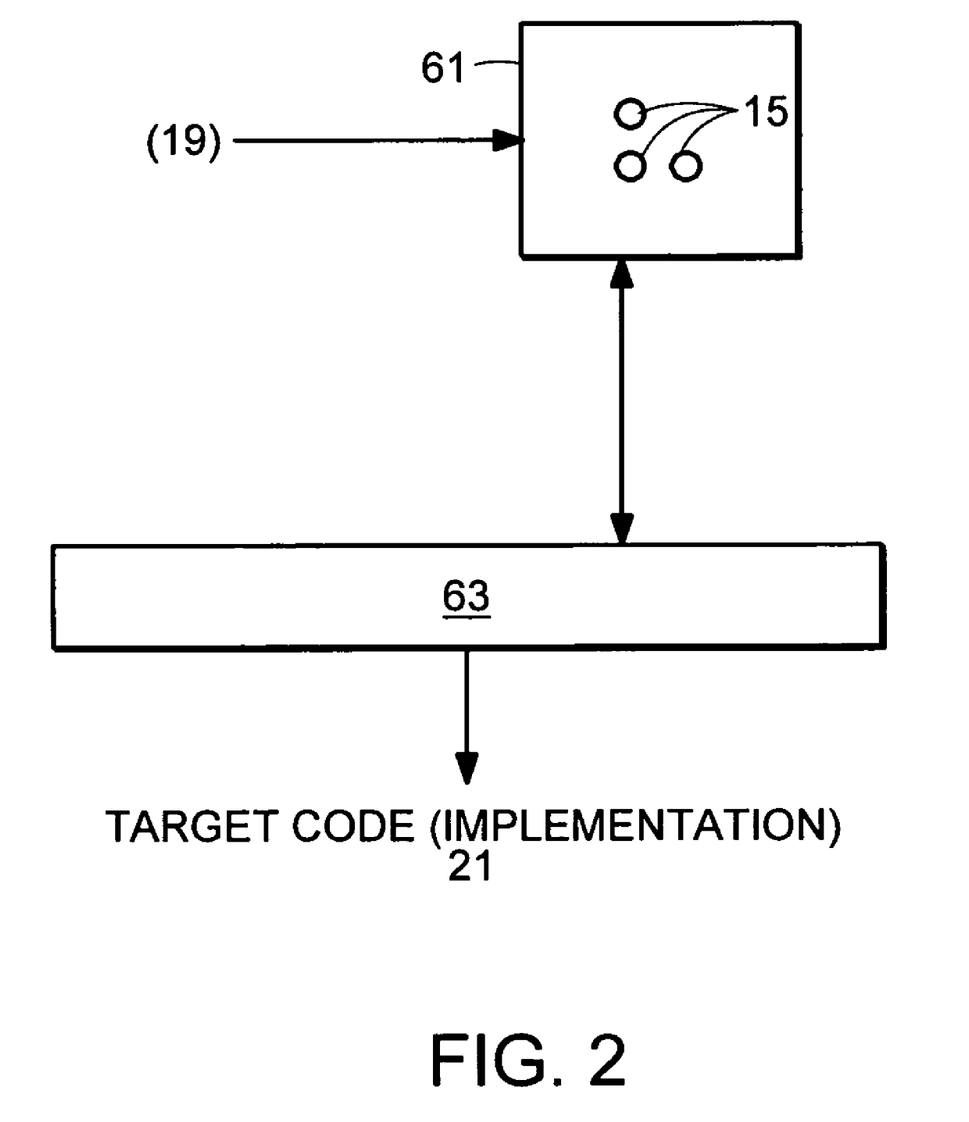
FIG. 2 is a schematic view of the preferred embodiment generating an implementation (target code).

As illustrated in FIG. 2, a subject user model formed of model elements 15 is initially represented by a Rose model 61 based on destination package 19. A code generation model builder 63 records information about package collapse relationships when it processes the Rose model 61. Later, during code generation, code generation model builder 63 processes collapse relationships between all packages 13 according to the rules outlined above. On output code generation model builder 63 provides the target implementation 21.

Figure 3:
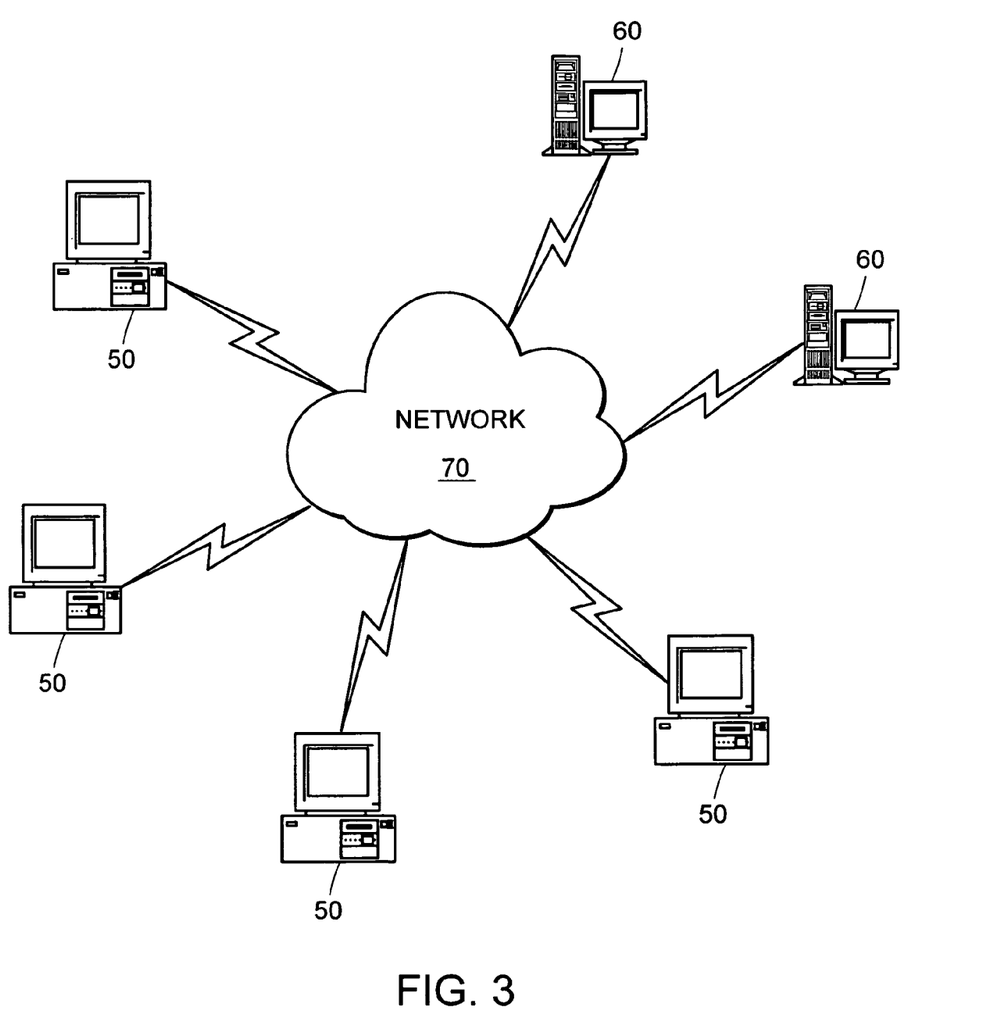
FIG. 3 is a schematic view of a computer environment in which the principles of the present invention may be implemented.

FIG. 3 illustrates an example computer environment in which the present invention operates. Client computer(s) 50 and server computer(s) 60 provide processing, storage, and input/output devices executing application programs and the like. Client computer(s) 50 can also be linked through communications network 70 to other computing devices, including other client computer(s) 50 and server computer(s) 60. Communications network 70 can be part of the Internet, a worldwide collection of computers, networks, and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, the methods are implemented on a standalone computer. In either network or standalone, the invention output software design and model implementations (API's) are sharable and reusable among users.

Figure 4:
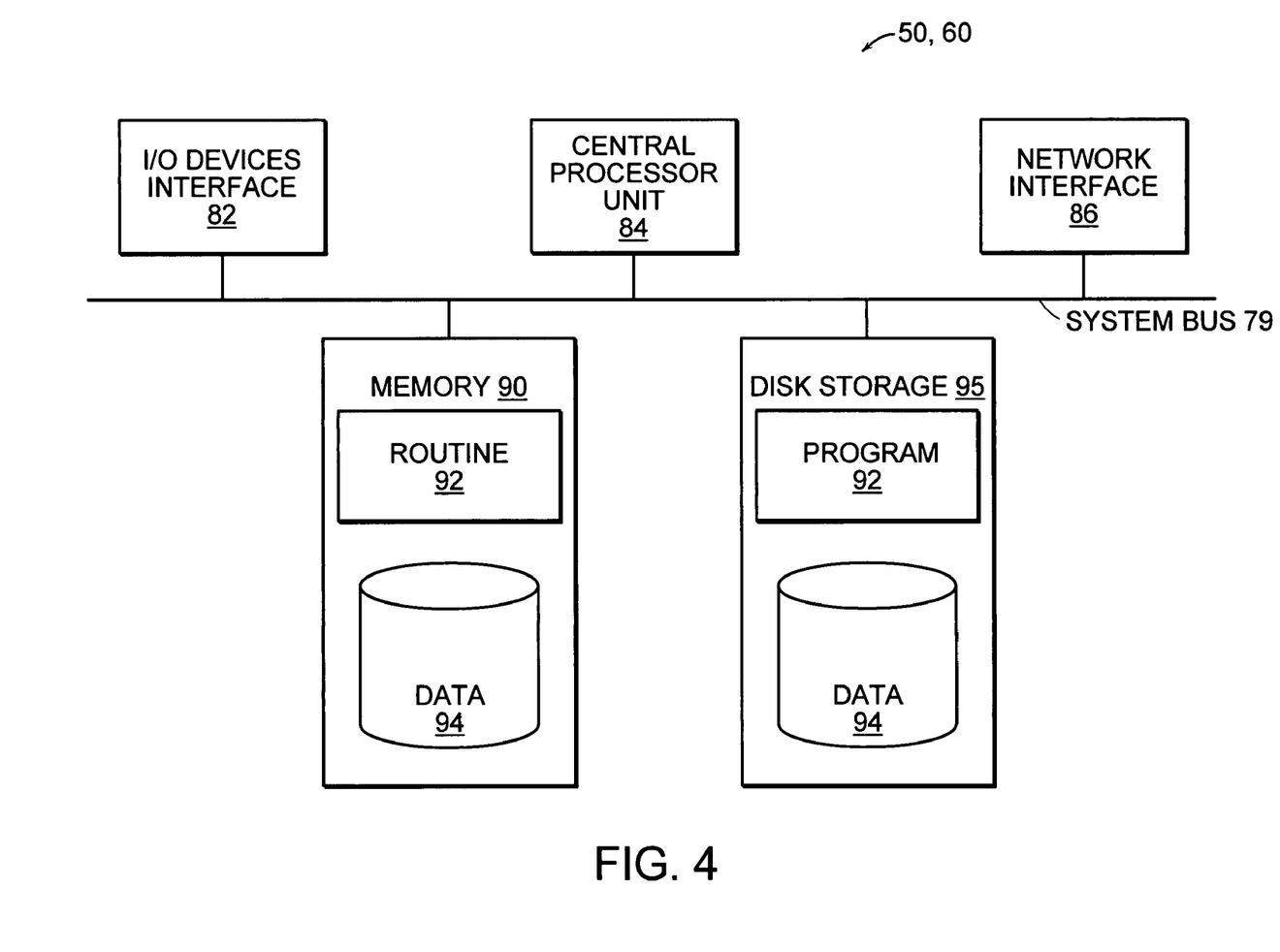
FIG. 4 is a block diagram of the internal structure of a computer from the FIG. 3 computer environment.

FIG. 4 is a diagram of the internal structure of a computer (e.g., client computer(s) 50 or server computers 60) in the computer system of FIG. 3. Each computer contains system bus 79, where a bus is a set of hardware lines used for data transfer among the components of a computer. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., displays, printers, speakers, etc.) to the computer. Network interface 86 allows the computer to connect to various other devices attached to a network (e.g., network 70 of FIG. 3). Memory 90 provides volatile storage for computer software instructions used to implement an embodiment of the present invention (e.g., EMF/code generation model builder 63 and Rose models 61 of subject Program Routines 92 and Data 94). Disk storage 95 provides non-volatile storage for computer software instructions and data used to implement an embodiment of the present invention. Central processor unit 84 is also attached to system bus 79 and provides for the execution of computer instructions.

Figure 5:
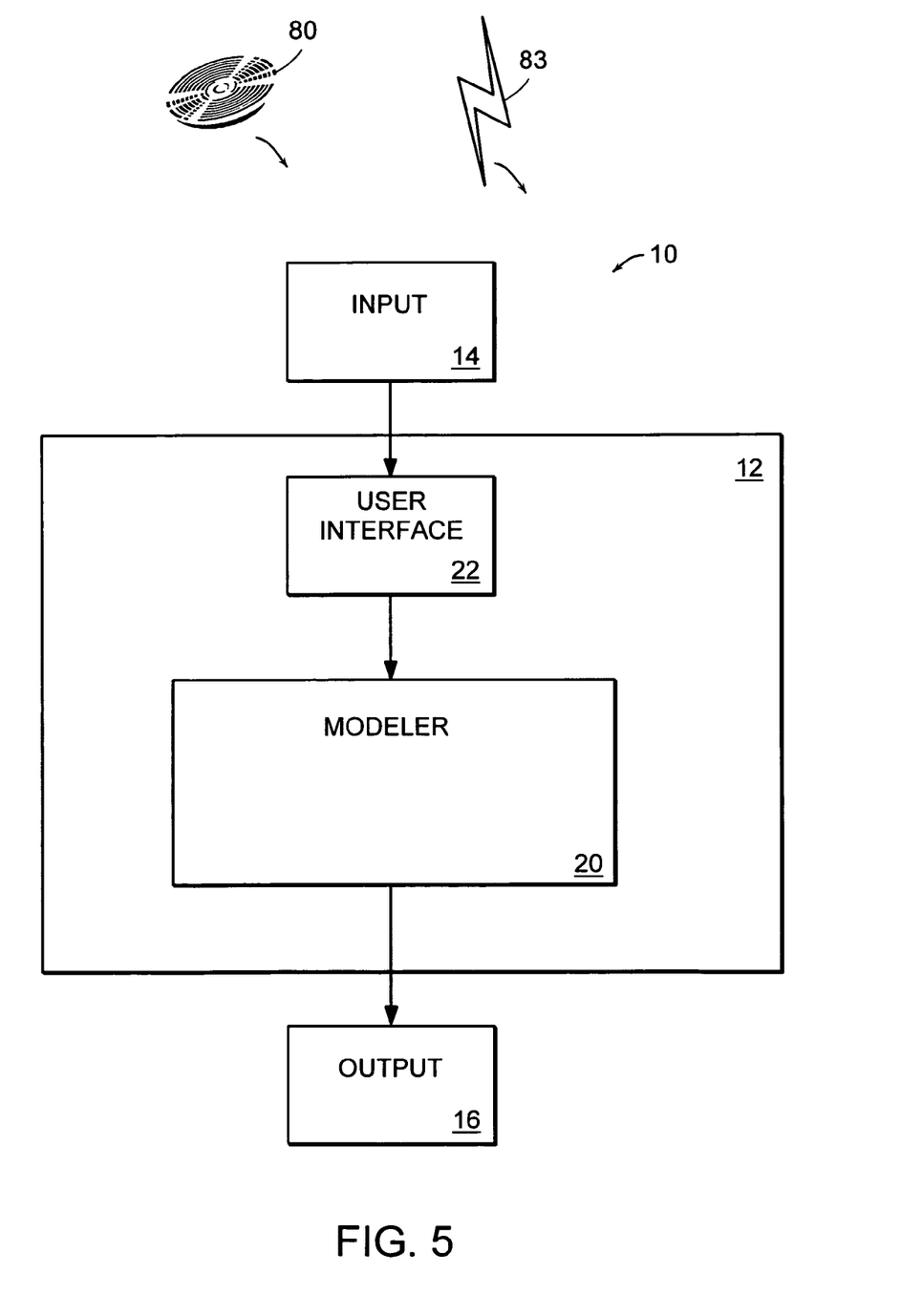
FIG. 5 is a schematic illustration of computer systems implementing methods of the present invention.

Referring now to FIG. 5 illustrated is another computer system 10 embodying the present invention techniques mentioned above. Generally, computer system 10 includes digital processor 12 in which subject modeling language and EMF code 20 are utilized. Input means 14 provides user commands, selections (generally communication) to computer system 10.

Responsive to input means 14 is user interface 22. User interface 22 receives user input data from input means 14 and provides input data for processing and manipulation at 20. The methods of the invention are implemented at 20 for collapsing metamodels and packages for use in the designing of Application Program Interfaces (subject implementations) 21 in Java, UML, EMF, object oriented programming languages and the like which are output at 16. Output 16 may be a display monitor, printer or other computer.

In one embodiment, computer program product 80, including a computer readable medium (e.g., a removable storage medium such as one or more DVD-ROM's, CD-ROM's, diskettes, tapes, etc.) provides at least a portion of the software instructions at 20 and/or user interface 22. Computer program product 80 can be installed by any suitable software installation procedure, as is well known in the art. In another embodiment, at least a portion of the software instructions may also be downloaded over a wireless connection. Computer program propagated signal product 83 embodied on a propagated signal on a propagation medium (e.g., a radio wave, an infrared wave, a laser wave, a sound wave, or an electrical wave propagated over a global network such as the Internet, or other network(s)) provides at least a portion of the software instructions at 20 and/or user interface 22.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 80 is a propagation medium that the computer system 10 may receive and read, such as by receiving the propagation medium and identifying a propagated signal embodied in the propagation medium, as described above for computer program propagated signal product 83.

Generally speaking, the term "carrier medium" or transient carrier encompasses the foregoing transient signals, propagated signals, propagated medium, storage medium and the like.

While this invention has been particularly shown and described with references to preferred embodiments thereof, it will be understood by those skilled in the art that various changes in form and details may be made therein without departing from the scope of the invention encompassed by the appended claims.

For example, the code generation model builder 63 may be implemented in UML, EMF and other modeling languages. The produced API or target code 21 may be in Java, UML, XML, EMF, object oriented programming languages and the like.

What is claimed is:

1. A computer method for collapsing program metamodels, comprising the steps of:

obtaining multiple programming model packages of various ambiguous namespace, each model package formed of a respective plurality of model elements from subject metamodels, the model packages having different class definitions, and model elements of one model package having a different class than model elements of another model package;

forming a destination package that effectively combines class definitions of the multiple packages by using most general types and most general multiplicities of the classes;

adding collapse relationships between the destination package and the multiple packages instead of representing package merge relationships between the multiple packages;

using the destination package, transforming from the various ambiguous namespace of the multiple packages to a single namespace, the transforming collapsing contents from the multiple packages and their subpackages into the destination package, the transforming being performed recursively as a function of the collapse relationships added between the multiple packages and the destination package and avoiding need for representing package merge relationships between model packages, the destination package resulting in a flattened Application Program Interface (API) with the single namespace in which there is only one type with a given name; and generating an implementation of a derived software program based on the destination package and API by processing the collapse relationships.

2. A method as claimed in claim 1 wherein the step of generating includes utilizing the destination package definition of model elements implementation.

3. A method as claimed in claim 1 wherein the step of transforming includes for the different class definitions in the multiple packages, collapsing the different class definitions into one common resultant class definition.

4. A method as claimed in claim 1 wherein the step of transforming includes for each operation definition in the multiple packages, collapsing the operation definition into one resultant operation definition.

5. A method as claimed in claim 1 wherein the step of transforming includes for each property definition in the multiple packages, collapsing the property definition into one resultant property destination.

6. A method as claimed in claim 1 wherein the step of transforming employs a set of rules to copy portions of the multiple packages into the destination package such that the destination package is effectively a resultant collapsed package.

7. A computer method for providing collapsed-in-syntax programming metamodels, comprising:

obtaining multiple programming model packages of various ambiguous namespace, each formed of a respective plurality of model elements from subject metamodels, the model packages having different class definitions, and model elements of one model package having a different class than model elements of another model package;

forming a resultant collapsed package that combines the class definitions of the multiple packages;

adding collapse relationships between the multiple packages and the resultant collapsed package and omitting representing package merge relationships between the multiple packages; and using the resultant collapsed package, transforming from the various ambiguous namespace of the multiple packages to effectively combine the multiple packages into a single namespace, the transforming collapsing contents from the multiple packages and their subpackages into the resultant collapsed package, the resultant collapsed package using as the single namespace most general types and most general multiplicities of the classes, the transforming being performed recursively as a function of the collapse relationships added between the multiple packages and the resultant collapsed package, the resultant collapsed package providing a flattened API with the single namespace in which there is only one type with a given name, and enabling generation of an implementation of a desired software product.

8. A computer program product for collapsing in syntax programming models, comprising:

computer readable code embodied in a computer storage medium, the computer readable code when executed by a digital processor forming collapsed programming metamodels by carrying out the steps of:

obtaining multiple programming model packages of various ambiguous namespace, each formed of a respective plurality of model elements from subject metamodels, the model packages having different class definitions, and model elements of one model package having a different class than model elements of another model package;

forming a destination package that effectively combines class definitions of the multiple packages by using most general types and most general multiplicities of the classes;

adding collapse relationships between the destination package and the multiple packages instead of representing package merge relationships between the multiple packages;

using the destination package, transforming the various ambiguous namespace of the multiple packages to a single namespace, the transforming collapsing content from the multiple packages and their subpackages into the destination package, the transforming being recursive as a function of the collapse relationships between the multiple packages and the destination package and avoiding need to represent package merge relationships between model packages, the destination package resulting in a flattened API with the single namespace in which there is only one type with a given name; and generating an implementation of a derived software program based on the destination package and API by processing the collapse relationships.

9. The computer program product as claimed in claim 8 wherein the step of generating includes utilizing the destination package definition of model elements implementation.

10. The computer program product as claimed in claim 8 wherein the step of transforming includes for the different class definitions in the multiple packages, collapsing the different class definitions into one common resultant class definition.

11. The computer program product as claimed in claim 8 wherein the step of transforming includes for each operation definition in the multiple packages, collapsing the operation definition into one resultant operation definition.

12. The computer program product as claimed in claim 8 wherein the step of transforming includes for each property definition in the multiple packages, collapsing the property definition into one resultant property destination.

13. The computer program product as claimed in claim 8 wherein the step of transforming employs a set of rules to copy portions of the multiple packages into the destination package such that the destination package is effectively a resultant collapsed package.

14. A computer system for collapsing syntax of programming metamodels, comprising:
- a source of programming model packages of various ambiguous namespace, each model package being formed of a respective plurality of model elements from a subject metamodel, the model packages having different class definitions and model elements of one model package having a different class than model elements of another model package;
- a collapsed package that effectively combines class definitions of the multiple packages together by using most general types and most general multiplicities of the classes;
- one or more collapse relationships between the collapsed package and the multiple packages instead of representing package merge relationships between the multiple packages;
- combining means responsive to the source for transforming from the various ambiguous namespace of the multiple packages to a single namespace, the transforming collapsing content from the multiple packages and their subpackages into the collapsed package, the transforming being based on the collapse relationships added between the multiple packages and the collapsed package and avoiding need for representing package merge relationships between model packages, the collapsed package resulting in a flattened API with the single namespace in which there is only one type with a given name; and
- code generation means for generating an implementation based on the collapsed package and resulting API by processing the collapse relationships.

15. A computer system as claimed in claim 14 wherein the combining means is rules-based, and includes rules for copying portions of the multiple programming model packages into the collapsed package.

16. A computer system as claimed in claim 14 wherein for each class definition in the multiple programming model packages, the combining means collapses the class definition into one resultant class definition for the collapsed package.

17. A computer system as claimed in claim 14 wherein for each operation definition in the multiple programming model packages, the combining means collapses the operation definition into one resultant operation definition for the collapsed package.

18. A computer system as claimed in claim 14 wherein for each property definition in the multiple programming model packages, the combining means collapses the property definition into one resultant property definition for the collapsed package.

\* \* \* \* \*